(12) United States Patent
Dittmann

(10) Patent No.: US 7,988,362 B2
(45) Date of Patent: Aug. 2, 2011

(54) BEARING BUSH SYSTEM FOR A TWO-PART STEERING SHAFT

(76) Inventor: Ludwig Dittmann, Berlin (DE)

( * ) Notice: Subject to any disclaimer, the term of this patent is extended or adjusted under 35 U.S.C. 154(b) by 497 days.

(21) Appl. No.: 12/224,702

(22) PCT Filed: Jan. 31, 2007

(86) PCT No.: PCT/DE2007/000203
§ 371 (c)(1),
(2), (4) Date: Sep. 3, 2008

(87) PCT Pub. No.: WO2007/101414
PCT Pub. Date: Sep. 13, 2007

(65) Prior Publication Data
US 2009/0028479 A1    Jan. 29, 2009

(30) Foreign Application Priority Data

Mar. 8, 2006    (DE) .................. 10 2006 012 057

(51) Int. Cl.
*F16C 17/00* (2006.01)
*F16C 33/02* (2006.01)
*F16C 33/74* (2006.01)
(52) U.S. Cl. .................. 384/275; 384/130; 384/276
(58) Field of Classification Search .................. 384/130, 384/273, 275–276, 290, 363, 477, 909, 463; 277/437, 502, 507, 565, 577; 280/276, 437, 280/560, 572
See application file for complete search history.

(56) References Cited

U.S. PATENT DOCUMENTS

| 2,512,098 | A | * | 6/1950 | Gratzmuller | 277/437 |
|---|---|---|---|---|---|
| 4,261,583 | A | | 4/1981 | de Vries, Jr. et al. | |
| 4,493,490 | A | * | 1/1985 | Ohma | 280/276 |
| 4,531,452 | A | * | 7/1985 | Spielmann et al. | 92/168 |
| 4,616,837 | A | * | 10/1986 | Beutel | 277/565 |
| 4,934,668 | A | | 6/1990 | Vassmer | |
| 5,192,137 | A | | 3/1993 | Renard | |
| 5,421,591 | A | * | 6/1995 | Katzensteiner | 277/550 |
| 5,816,615 | A | * | 10/1998 | Dupont et al. | 280/780 |
| 6,004,039 | A | * | 12/1999 | Yabe et al. | 384/463 |
| 6,065,292 | A | * | 5/2000 | Unterberg | 60/589 |
| 6,203,022 | B1 | | 3/2001 | Struschka et al. | |
| 6,575,471 | B1 | * | 6/2003 | Grosspietsch et al. | 277/436 |

(Continued)

FOREIGN PATENT DOCUMENTS

DE    2948248 A1 *    6/1981

(Continued)

OTHER PUBLICATIONS

International Search Report, May 30, 2007.

*Primary Examiner* — Marcus Charles
(74) *Attorney, Agent, or Firm* — Collard & Roe, P.C.

(57) ABSTRACT

A bearing bush system includes a bearing bush of polyamide that is held on an outer steering shaft with a stopping collar and on the free face of which the one-piece sealing element of thermoplastic elastomer that seals statically with a ring seal as well as dynamically with sealing lips is held in a form-fitting fashion by means of watchtower-like denticulated ribs provided on both sides. The bearing bush system of two plastics forms a single component, requires low manufacturing expenditures, can be easily assembled and also ensures a reliable seal.

9 Claims, 1 Drawing Sheet

U.S. PATENT DOCUMENTS

| | | | |
|---|---|---|---|
| 6,681,885 B2 * | 1/2004 | Harer | 180/427 |
| 6,722,658 B2 | 4/2004 | Siegrist et al. | |
| 6,786,489 B1 | 9/2004 | Hennemann et al. | |
| 6,862,884 B2 * | 3/2005 | Cohen et al. | 60/589 |
| 2003/0052468 A1 * | 3/2003 | Harer | 280/93.514 |
| 2004/0182238 A1 | 9/2004 | Mita | |
| 2005/0067242 A1 | 3/2005 | Vanmechelen et al. | |
| 2008/0231003 A1 * | 9/2008 | Moriyama et al. | 277/636 |
| 2008/0317394 A1 | 12/2008 | Blanke et al. | |

FOREIGN PATENT DOCUMENTS

| | | |
|---|---|---|
| DE | 691 01 303 | 10/1994 |
| DE | 196 15 157 | 10/1997 |
| DE | 198 39 597 | 3/2000 |
| DE | 100 10 524 | 9/2001 |
| DE | 10 2004 005 114 | 9/2004 |
| DE | 103 29 893 | 2/2005 |
| FR | 1 357 192 | 4/1964 |
| WO | WO 2006/007822 | 1/2006 |

* cited by examiner

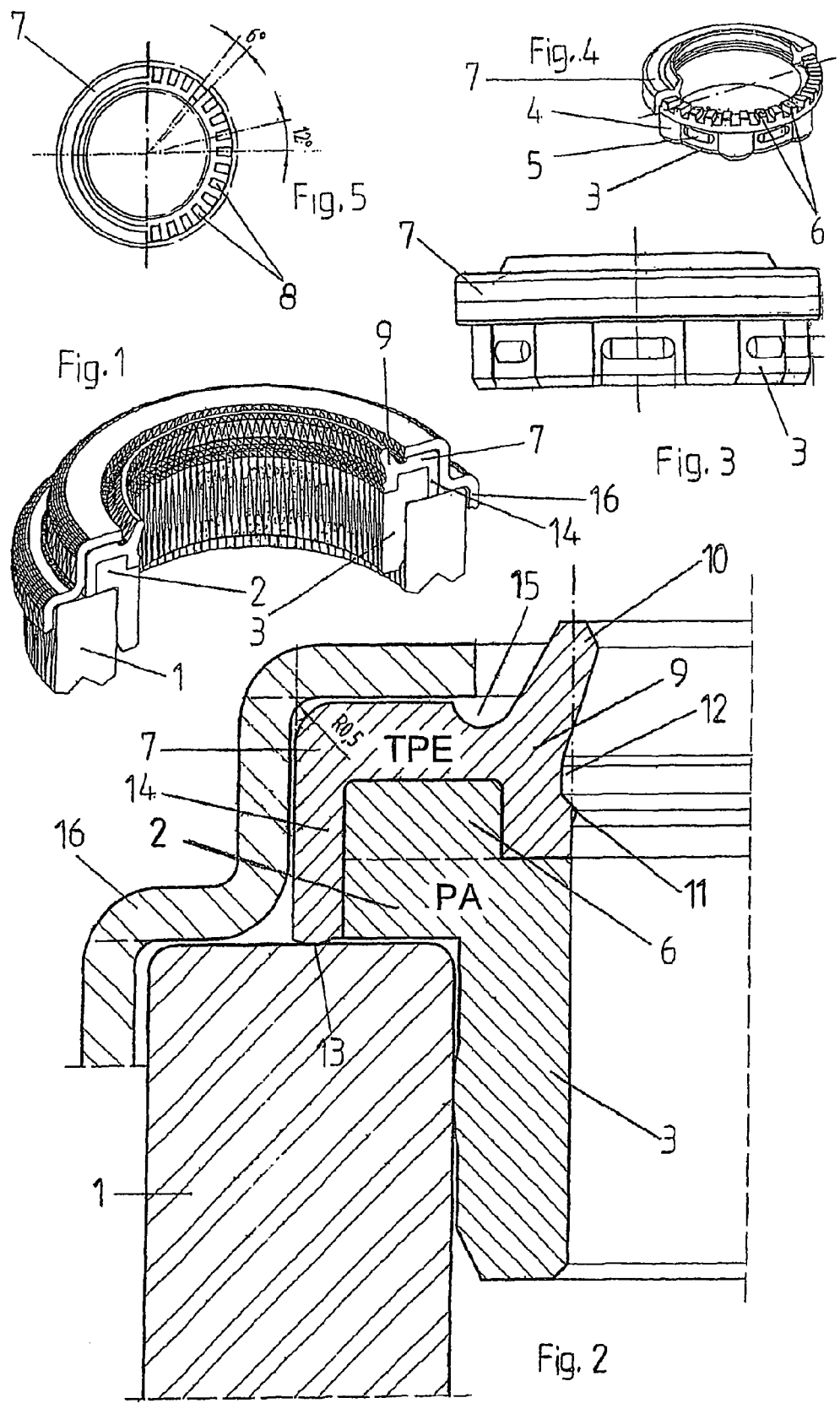

BEARING BUSH SYSTEM FOR A TWO-PART STEERING SHAFT

CROSS REFERENCE TO RELATED APPLICATIONS

This application is the National Stage of PCT/DE2007/000203 filed on Jan. 31, 2007, which claims priority under 35 U.S.C. §119 of German Application No. 10 2006 012 057.4 filed on Mar. 8, 2006. The international application under PCT article 21(2) was not published in English.

BACKGROUND OF THE INVENTION

1. Field of the Invention

The invention pertains to a bearing bush system for a two-part steering shaft that serves for producing an axially movable and sealing connection between an outer steering shaft and an inner steering shaft and comprises a bearing bush, static and dynamic sealing means and a covering cap.

2The Prior Art

One known two-part steering shaft for utility vehicles comprises an outer steering shaft that consists of an outer tube and features a bearing bush that is integrated into its free end, as well as an inner steering shaft that is realized in the form of an inner tube and guided in this bearing bush in an axially movable fashion in order to compensate vibrations that occur during the operation of the vehicle and are transmitted to the steering shaft or to allow a length compensation of the steering shaft when tilting the driver's cab. The bearing bush should not only allow a free and vibration-damping sliding movement, but also ensure an adequate outward seal between the two concentrically arranged parts so as to prevent the admission of splash and washing water, as well as dirt, dust and sand particles.

In order to mutually seal the two steering shaft parts, it was already proposed to utilize a bearing bush arrangement with a shaft seal attached on the outer face of the bearing bush, wherein the peripheral sealing lip of this shaft seal rests against the surface of the inner steering shaft. The shaft seal is fixed with the aid of an elbowed holding sleeve. The static seal between the bearing bush and the steering shaft is realized with an O-ring that is arranged between the holding sleeve and the face of the outer steering shaft.

One disadvantage of the proposed solution can be seen in the high manufacturing costs and assembly expenditures for the bearing brush that consists of four individual parts in all. In addition, the O-ring may be excessively compressed by the holding sleeve such that it loses its elasticity and therefore its sealing effect that is based on this elasticity.

SUMMARY OF THE INVENTION

The invention is based on the objective of developing a bearing bush for a two-part steering shaft that can be manufactured and assembled with low expenditures and also has improved sliding and sealing effects.

According to the invention, this objective is attained with a bearing bush that is described in this application.

In other words, the fundamental idea of the invention consists of the form-fitting connection between the bearing bush that is held on the outer steering shaft with a stopping collar and consists of a hard plastic and a one-piece sealing element that is moulded of a flexible plastic and not only comprises a dynamic lip seal relative to the inner steering shaft, but also a static ring seal for producing the seal on the face of the outer steering shaft. In order to fix the sealing element on the face of the bearing bush in a form-fitting fashion, interlocking watchtower-like denticulated ribs are realized on both sides and also absorb the prestressing force of the holding bush, wherein the denticulated ribs are also anchored within one another due to the shrinkage that occurs when they cool off. The integrally moulded static ring seal extends over the height of the lateral surface of the stopping collar and therefore has a high elastic sealing effect. This bearing bush represents a combination of two plastics that form a single component, wherein this bearing bush can be manufactured and assembled with low expenditures and ensures a reliable static and dynamic seal.

In an additional development of the invention, the static seal comprises two peripheral sealing lips that are spaced apart and arranged on top of one another such that a lubricant reservoir is formed therebetween. This improves the sliding properties, as well as the dynamic seal.

In one embodiment of the invention, longitudinal ribs and/or lateral ribs are integrally moulded on the outer surface of the bearing bush for reinforcing purposes.

The one-piece sealing element consists of a thermoplastic elastomer that is supported on or in the denticulated ribs of the preferably polyamide bearing bush and thusly prevented from yielding. The polyamide preferably contains an internal lubricant such as, for example, Teflon or molybdenum dioxide.

BRIEF DESCRIPTION OF THE DRAWINGS

One embodiment of the invention that also results in other advantageous designs of the bearing bush system is described in greater detail below with reference to the drawings. In these drawings:

FIG. 1 shows a sectioned perspective representation of a bearing bush arrangement that is situated on the outer steering shaft;

FIG. 2 shows an enlarged representation of part of the bearing bush system;

FIG. 3 shows a side view of a bearing bush with a statically and dynamically acting sealing element arranged thereon in a self-locking fashion;

FIG. 4 shows a perspective representation of the bearing bush system according to FIG. 3, however, with the sealing element partially cut away, and FIG. 5 shows a bottom view of the sealing element.

DETAILED DESCRIPTION OF THE DRAWINGS

According to FIGS. 1 and 2, a bearing bush 3 is arranged in the interior of an outer steering shaft 1 and held on a stopping collar 2 with its face in order to accommodate a (not-shown) inner steering shaft in an axially movable fashion. The bearing bush 3 consists of a hard first plastic, namely of polyamide in the embodiment shown, into which an internal lubricant such as, for example, Teflon or molybdenum dioxide is chemically incorporated. Longitudinal ribs 4 of semicircular cross section and/or lateral ribs 5 lying therebetween are integrally moulded on the outer circumference of the bearing bush 3 within regular distances from one another. First denticulated ribs 6 are provided on the face of the stopping collar 2 and the bearing bush 3. A sealing element 7 that also overlaps the lateral surface of the stopping collar 2 is fixed on the face of the bearing bush 3 in a form-fitting fashion, namely with the aid of second denticulated ribs 8 that are integrally moulded on the underside of the sealing element 7 and engage into the gaps between the first denticulated ribs 6.

The sealing element 7 consists of a soft second plastic, i.e., of a thermoplastic elastomer (TPE, technical rubber) that shrinks on the bearing bush consisting of the hard plastic when it cools off such that its (second) denticulated ribs 8 become anchored in the (first) denticulated ribs 6 of the bearing bush 3 and a rigid, intimate, but not rubberized adhesive, connection is produced between the bearing bush 3 and the sealing element 7. The pressure acting upon the sealing element 7 of soft thermoplastic elastomer is absorbed by the bearing bush 3 and the denticulated ribs 6 consisting of hard polyamide. The quantity of thermoplastic elastomer material that is reduced due to the rib structure also results in a direct support of the sealing element 7 and therefore suppresses its tendency to yield under high pressure.

The sealing element 7 features an inner limb 9 (lip ring seal) with two peripheral sealing lips that are spaced apart and arranged on top of one another, i.e., a first sealing lip 10 and a second sealing lip 11 with a lubricant reservoir 12 formed therebetween. A peripheral outer limb rests against the lateral surface of the stopping collar 2 and, together with its bulge 13 that slightly protrudes over the lateral surface of the stopping collar 2 and rests against the face of the outer steering shaft 1, forms a static ring seal 14 with a large excursion that corresponds to the long limb length. This static seal also maintains its elastically sealing effect under very high pressures. In order to increase the elasticity of the first (upper) sealing lip 11, a groove 15 is arranged in the sealing element 7 at the transition to this sealing lip 10. The bearing bush 3 and the sealing element 7 that is rigidly connected thereto and features the two dynamic seals forming first and second sealing lips 10, 11 and the statically acting ring seal 14 collectively form a single first component consisting of two plastics that are rigidly fitted together, wherein this first component is fixed on the face of the outer steering shaft 1 by means of a second component, namely a metallic covering cap 16.

The bearing bush arrangement therefore consists of only two components that can be easily assembled and fulfill five functions, i.e., the function of a sliding bearing, of a static seal and of a dynamic seal including lubricating effect and attachment. The manufacturing and assembly expenditures for such a bearing bush arrangement consequently are low. In addition, the two lip seals and the lubricant reservoir, as well as a highly elastic static seal, result in a one-piece sealing element that produces an excellent seal against water under pressure or splash water, steam, dirt, dust and sand.

In addition, the two plastic parts of the first component are connected to one another in a form-fitting fashion such that yielding of the soft sealing material under the influence of pressure is avoided.

LIST OF REFERENCE SYMBOLS

1 Outer steering shaft
2 Stopping collar
3 Bearing bush
4 Longitudinal ribs
5 Lateral ribs
6 First denticulated ribs, see 3
7 Sealing element
8 Second denticulated ribs, see 7
9 Inner limb/dynamic lip seal, see 7
10 First sealing lip
11 Second sealing lip
12 Lubricant reservoir
13 Bulge
14 Static ring seal
15 Groove
16 Covering cap

The invention claimed is:

1. A bearing bush system for a two-part steering shaft that serves for producing an axially movable and sealing connection between an outer steering shaft and an inner steering shaft, the bearing bush system comprising:
 a bearing bush;
 a one-piece static and dynamic sealing element; and
 a covering cap;
 wherein the bearing bush has a face, comprises a hard plastic, is provided with a stopping collar, and is connected on the face to the one-piece static and dynamic sealing element;
 wherein the one-piece static and dynamic sealing element comprises flexible plastic material and seals statically and dynamically via a shrink denticulation, the shrink denticulation interlocking in a form-fitting fashion and simultaneously supporting the flexible plastic material;
 wherein a peripheral inner limb of the one-piece static and dynamic sealing element is provided as a dynamic seal and features a first sealing lip; and
 wherein a peripheral outer limb of the one-piece static and dynamic sealing element overlaps a lateral surface of the stopping collar, contacts the face of the outer shaft, and acts as a static ring seal.

2. The bearing bush system according to claim 1, wherein the shrink denticulation comprises first and second denticulated ribs arranged on the one-piece static and dynamic sealing element and on the bearing bush; and
 wherein the first and second denticulated ribs are mechanically anchored in one another due to the shrinkage that occurs when the flexible plastic material cools off.

3. The bearing bush system according to claim 1, wherein a second peripheral sealing lip is arranged at a distance from the first sealing lip such that the second peripheral and first sealing lips enclose a lubricant reservoir.

4. The bearing bush system according to claim 1, wherein a peripheral groove is arranged in the one-piece static and dynamic sealing element at a transition to the peripheral inner limb.

5. The bearing bush system according to claim 1, wherein the static ring seal of the one-piece static and dynamic sealing element features a free face and a bulge on the free face, the bulge protruding over the lateral surface of the stopping collar and contacting the steering shaft.

6. The bearing bush system according to claim 1, wherein longitudinal ribs and/or lateral ribs of semicircular cross section are integrally molded on an outer surface of the bearing bush.

7. The bearing bush system according to claim 1, wherein the hard plastic used for the bearing bush comprises polyamide with a chemically incorporated internal lubricant.

8. The bearing bush system according to claim 7, wherein the chemically incorporated internal lubricant comprises Teflon or molybdenum dioxide.

9. The bearing bush system according to claim 1, wherein the flexible plastic material used for the one-piece static and dynamic sealing element comprises a thermoplastic elastomer.

* * * * *